United States Patent
Ogiwara et al.

(10) Patent No.: US 9,982,390 B2
(45) Date of Patent: May 29, 2018

(54) PAPERMAKING FELT

(71) Applicant: Ichikawa Co., Ltd, Bunkyo-ku (JP)

(72) Inventors: Yasuyuki Ogiwara, Bunkyo-ku (JP); Hirofumi Murakami, Bunkyo-ku (JP)

(73) Assignee: Ichikawa Co., Ltd., Bunkyo-ku (JP)

( * ) Notice: Subject to any disclaimer, the term of this patent is extended or adjusted under 35 U.S.C. 154(b) by 0 days. days.

(21) Appl. No.: 15/206,404

(22) Filed: Jul. 11, 2016

(65) Prior Publication Data

US 2017/0030019 A1    Feb. 2, 2017

(30) Foreign Application Priority Data

Jul. 28, 2015 (JP) ................................. 2015-159712

(51) Int. Cl.
*D21F 7/08* (2006.01)
*B29C 53/56* (2006.01)
(Continued)

(52) U.S. Cl.
CPC .............. *D21F 7/083* (2013.01); *B29C 53/56* (2013.01); *B29C 53/58* (2013.01); *B32B 7/005* (2013.01); *D21F 7/12* (2013.01); *D21F 1/0081* (2013.01)

(58) Field of Classification Search
CPC ... D21F 7/08; D21F 7/083; D21F 7/10; D21F 7/12; D21F 1/10; D21F 1/105; D21F 1/12; D21F 1/0027; D21F 1/0036; D21F 1/0045; D21F 1/0054; D21F 1/0081; B29C 53/56; B29C 53/562; B29C 53/566; B29C 53/58; B29C 53/583; B29C 53/60
(Continued)

(56) References Cited

U.S. PATENT DOCUMENTS 5,360,656 A    11/1994 Rexfelt et al.
5,713,399 A    2/1998 Collette et al.
(Continued)

FOREIGN PATENT DOCUMENTS

EP    1 067 238 A2    1/2001
EP    1 067 239 A2    1/2001
(Continued)

OTHER PUBLICATIONS

Extended European Search Report dated Nov. 30, 2016 in Patent Application No. 16180158.4.

*Primary Examiner* — Eric Hug
(74) *Attorney, Agent, or Firm* — Oblon, McClelland, Maier & Neustadt, L.L.P.

(57) ABSTRACT

There is provided a papermaking felt including: a base fabric layer including at least two layers of a first base fabric layer and a second base fabric layer, each of which is formed by spirally winding a band-shaped body. The first base fabric layer and the second base fabric layer are laminated together such that a direction of spiral winding of the first base fabric layer and a direction of spiral winding of the second base fabric layer are different; A magnitude of a displacement with respect to a cross-machine direction between two intersection points formed by a straight line that passes through intersection points of the side edges of the respective band-shaped bodies of the first base fabric layer and the second base fabric layer and has a minimum angle to the cross-machine direction and both ends of the papermaking felt is 2 cm or more.

6 Claims, 6 Drawing Sheets

(51) Int. Cl.
 *B29C 53/58* (2006.01)
 *B32B 7/00* (2006.01)
 *D21F 7/12* (2006.01)
 *D21F 1/00* (2006.01)

(58) Field of Classification Search
 USPC ......... 162/358.1, 358.2, 900, 902, 903, 904; 139/383 A, 383 AA; 156/184, 188, 190, 156/191, 195
 See application file for complete search history.

(56) References Cited

U.S. PATENT DOCUMENTS

| | | | |
|---|---|---|---|
| 5,785,818 A * | 7/1998 | Fekete | ............ D21F 1/0036 139/383 AA |
| 5,916,421 A | 6/1999 | Yook | |
| 5,939,176 A | 8/1999 | Yook | |
| 6,117,274 A | 9/2000 | Yook | |
| 6,162,518 A | 12/2000 | Korfer | |
| 6,240,608 B1 | 6/2001 | Paquin et al. | |
| 6,265,048 B1 * | 7/2001 | Rydin | ............ D21F 1/0054 139/383 A |
| 6,350,336 B1 | 2/2002 | Paquin | |
| 6,565,713 B2 | 5/2003 | Hansen et al. | |
| 6,723,208 B1 | 4/2004 | Hansen | |
| 6,776,878 B2 | 8/2004 | Yook | |
| 7,101,599 B2 | 9/2006 | Moriarty | |
| RE39,709 E * | 7/2007 | Fekete | ............ D21F 1/0036 139/383 AA |

FOREIGN PATENT DOCUMENTS

| | | |
|---|---|---|
| EP | 1 067 239 A3 | 1/2001 |
| JP | 6-503385 | 4/1994 |
| JP | 10-226978 | 8/1998 |
| JP | 10-513511 | 12/1998 |
| JP | 2000-27089 | 1/2000 |
| JP | 2000-80584 | 3/2000 |
| JP | 2000-80585 | 3/2000 |
| JP | 2000-80586 | 3/2000 |
| JP | 2000-509772 | 8/2000 |
| JP | 2000-303378 | 10/2000 |
| JP | 2001-3290 | 1/2001 |
| JP | 2001-40594 | 2/2001 |
| JP | 2004-510896 | 4/2004 |
| JP | 2004-526877 | 9/2004 |
| JP | 2005-521807 | 7/2005 |
| JP | 2006-504873 | 2/2006 |

* cited by examiner

PAPERMAKING FELT

CROSS REFERENCE TO RELATED APPLICATION(S)

This application is based upon and claims benefit of priority from Japanese Patent Application No. 2015-159712, filed on Jul. 28, 2015, the entire contents of which are incorporated herein by reference.

BACKGROUND

The present invention relates to a papermaking felt used for a papermaking machine (hereinafter occasionally referred to as simply a "felt").

A papermaking machine that removes water from the source material of paper generally includes a wire part, a press part, and a drier part. The wire part, the press part, and the drier part are arranged in this order along the wet paper web conveyance direction. The wet paper web moves through the papermaking machine in a band shape, with a certain width in the direction (the cross-machine direction, CMD) perpendicular to the direction of running of the papermaking machine (the machine direction, MD), and is conveyed to be squeezed to remove water and finally dried in the drier part while being sequentially passed through the papermaking equipment provided in the wire part, the press part, and the drier part.

The press part comprises a plurality of press apparatuses that are provided side by side in series along the wet paper web conveyance direction. Each press apparatus comprises an endless felt or a felt in which ends of an ended felt are connected on the papermaking machine into an endless shape, and a pair of rolls (i.e., a roll press), which are arranged facing each other in the vertical direction to sandwich a part of the felt, or a cylindrical belt comprising a roll and a shoe (i.e., a shoe press), and uses the felt together with the rolls or the cylindrical belt including a roll and a shoe to press and apply pressure to the wet paper web conveyed by the felt running at a substantially constant speed in the fixed direction and thus dehydrates the wet paper web continuously.

Water squeezing capability, smoothness, running stability, etc. are required as functions for the felt used for the press apparatus. The water squeezing capability refers to the capability to remove water contained in the wet paper web. To achieve this function, it is important that the felt have a good compression recovery property, that is, when the felt is not under pressure, a space (void volume) for removing the water of the felt exist in the felt, and when the felt is under pressure, the density of the felt be maximized and the volume of the space be reduced to discharge the water to the outside of the felt. It is also important that the water squeezing capability be maintained during a period of use of the felt and that the removed water not return to the wet paper web (re-wetting prevention).

The smoothness refers to the smoothness of the surface of the wet paper web and the surface of the felt (including the surface of the felt under pressure). Since the wet paper web is pressed via the felt, the surface condition of the felt is transferred to the surface of the wet paper web. Hence, to smooth the surface of the wet paper web, it is necessary to smooth the surface of the felt (including the surface of the felt under pressure).

The running stability refers to the capability of the endless felt placed in the press apparatus to run stably without the occurrence of deviation, meandering, vibration, waving, etc.

There are various kinds of paper, such as paper for newspapers, high-quality paper, paperboards, and household paper, and there are also various kinds of papermaking machines that produce these kinds of paper. Various kinds of papermaking felt are currently produced to fit these kinds of paper and papermaking machines, in general, the felt is formed by integrating a batt layer of a nonwoven fiber material with a base fabric layer. The base fabric layer may be, for example, a woven fabric formed of monofilament yarns, monofilament twisted yarns, multifilament yarns, or multifilament twisted yarns, and the woven fabric may be a single-woven article or a multiple-woven article, or may be a laminated structure in which these are laminated together. The yarn can be usually made of a material produced by extrusion-molding a synthetic polymer resin that a person skilled in the technical field of papermaking equipment uses for this objective, such as a polyamide resin or a polyester resin, or animal fibers such as wool or vegetable fibers such as cotton or hemp.

As the base fabric layer mentioned above, there are various kinds of woven fabric, such as one in which weaving is performed on a weaving machine to obtain an endless shape (hollow weaving), one in which ends of an ended woven fabric obtained by plain weaving are sewn together into an endless shape, and one in which seam loops are formed at each of the two ends in the cross-machine direction of an ended woven fabric, the seam loops at both ends are engaged with each other on a papermaking machine, and a core line is inserted into their common holes to form an endless shape.

In any case, the base fabric layer has an endless form or is configured to allow its ends to be joined together into an endless form, and the length dimension and the width dimension of the base fabric layer (felt) are dimensions corresponding to each papermaking machine. Since the papermaking machines have various dimensions, the base fabric of the felt is produced completely in a made-to-order manner as a matter of course.

In the case where base fabric layers matched with various dimensions are woven with a weaving machine, the productivity is very poor and the yield is poor. In order to produce these base fabric layers more efficiently, a method in which a band-shaped body with a width smaller than the width dimension of the papermaking felt is spirally wound, the side edges of the band-shaped body are joined together, and the base fabric formed is used as the base fabric layer of the papermaking felt is proposed (e.g. JP H06-503385T JP H10-226978A, JP 2000-027089A, JP 2000-303378A, JP 2001-040594A, JP 2004-510896T, JP 2004-526877T, and JP 2006-504873T). Further, a method in which a band-shaped body narrower than the width dimension of the papermaking felt is spirally wound, the side edges of the band-shaped body are joined together, the base fabric formed is folded, and a seam loop is formed at the fold (e.g. JP H10-513511T, JP 2000-080585A, JP 2000-080586A, and JP 2005-521807T), and a method in which a band-shaped body narrower than the width dimension of the papermaking felt is spirally wound, the side edges of the band-shaped body are joined together, and the formed base fabric and an endless base fabric are laminated together (e.g. JP 2000-509772T, JP 2000-080584A, and JP 2001-003290A) are proposed.

SUMMARY

The base fabric layers using a band-shaped body of the papermaking felt disclosed in the prior art literatures mentioned above can be produced very efficiently, and is particularly efficient in a configuration in which a plurality of base fabric layers using a band-shaped body are laminated together. However, granted that the base fabric layer can be formed efficiently, the joint portion of the side edges cannot be formed as completely uniformly as the material portion, and the joint portion may cause a problem with, for example, the smoothness of wet paper web (the occurrence of paper marks) or the running performance (vibration, deviation, or meandering).

In particular, in a configuration in which a plurality of base fabric layers using a band-shaped body are laminated together, for example a configuration in which the base fabric layer is a two-layer laminate of a first base fabric layer and a second base fabric layer, there is a case where the intersection points of the joint portions of the side edges of the first base fabric layer and the joint portions of the side edge portions of the second base fabric layer are aligned in a straight line in CMD. There may arise a problem with the running performance that, for example, the straight line portion forms a starting point of vibration at the time of passage between a pair of rolls under pressure or an unusual sound occurs at the time of passage through a suction box.

An object of the present invention is to provide a papermaking felt that comprises a base fabric layer formed by laminating together at least two layers each of which is formed by spirally winding a band-shaped body and is different from another in the direction of winding and at least one bat layer integrated with the base fabric layer, and in which particularly the smoothness and the running stability are improved.

In a papermaking felt that comprises a base fabric layer formed by laminating together at least two layers each of which is formed by spirally winding a band-shaped body narrower than the width of the papermaking felt and is different from another in the direction of winding and at least one batt layer integrated with the base fabric layer, the present invention employs a configuration in which the intersection points of the joint portions of the side edges of the layers of the base fabric layer are not arranged in a straight line in CMD, and thus can achieve the objective, specifically, the present invention uses the following technology.

(1) A papermaking felt comprising a base fabric layer and at least one batt layer integrated with the base fabric layer, wherein the base fabric layer comprises at least two layers of a first base fabric layer and a second base fabric layer in which each of the first base fabric layer and the second base fabric layer is formed by spirally winding a band-shaped body having a width smaller than a width of the papermaking felt and having a plurality of ground warp yarns, a plurality of ground weft yarns, a first side edge, and a second side edge in such a manner that the first side edge and the second side edge are adjacent and joining the side edges together, and the first base fabric layer and the second base fabric layer are laminated together such that their directions of spiral are different each other; and a magnitude of a displacement with respect to a cross-machine direction between two intersection points formed by a straight line that passes through intersection points of the side edges of the respective band-shaped bodies of the first base fabric layer and the second base fabric layer and has a minimum angle to the cross-machine direction and both ends of the papermaking felt is 2 cm or more.

(2) The papermaking felt according to (1), wherein the magnitude of the displacement with respect to the cross-machine direction between the two intersection points formed by the straight line that passes through the intersection points of the side edges of the respective band-shaped bodies of the first base fabric layer and the second base fabric layer and has the minimum angle to the cross-machine direction and both ends of the papermaking felt is 5 cm or more.

(3) The papermaking felt according to (1) or (2), wherein the magnitude of the displacement with respect to the cross-machine direction between the two intersection points formed by the straight line that passes through the intersection points of the side edges of the respective band-shaped bodies of the first base fabric layer and the second base fabric layer and has the minimum angle to the cross-machine direction and both ends of the papermaking felt is 10 cm or more (4) The papermaking felt according to any one of (1) to (3), wherein the width of the band-shaped body of the first base fabric layer and the width of the band-shaped body of the second base fabric layer are different.

(5) The papermaking felt according to (4), wherein a least common multiple of the width of the band-shaped body of the first base fabric layer and the width of the band-shaped body of the second base fabric layer is larger than the width dimension of the papermaking felt.

By the above configuration, the papermaking felt of an embodiment of the present invention can provide a papermaking felt in which the intersection points of the joint portions of the side edges of the layers are not arranged in a straight line in CMD and thus particularly the smoothness and the running stability are improved.

DETAILED DESCRIPTION OF THE EMBODIMENT(S)

Hereinafter, referring to the appended drawings, preferred embodiments of the present invention will be described in detail.

Figure 1:
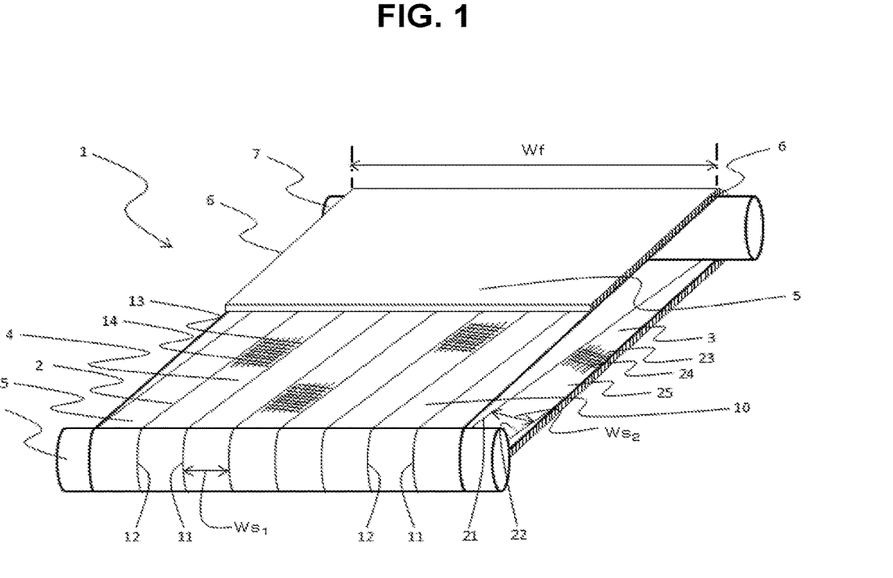
FIG. 1 is a perspective view showing an example of the papermaking felt of an embodiment of the present invention.

FIG. 1 is a perspective view showing an example of the papermaking felt according to an embodiment of the present invention. A felt 1 is a papermaking felt 1 that comprises a base fabric layer 4 and a batt layer 5 integrated with the base fabric layer 4. The base fabric layer 4 comprises a first base fabric layer 10 and a second fabric layer 20. The first base fabric layer 10 is formed by spirally winding a band-shaped body 15 having a width $Ws_1$ smaller than the width Wf of the papermaking felt and having a plurality of ground warp yarns 13, a plurality of ground weft yarns 14, a first side edge 11, and a second side edge 12 in such a manner that the first side edge 11 and the second side edge 12 are adjacent and thereby joining the side edges (the adjacent first side edge 11 and the second side edge 12) together. The second base fabric layer 20 is formed by spirally winding a band-shaped body 25 having a width $Ws_2$ smaller than the width Wf of the papermaking felt and having a plurality of ground warp yarns 23, a plurality of ground weft yarns 24, a first side edge 21, and a second side edge 22 in such a manner that the first side edge 21 and the second side edge 22 are adjacent and thereby joining the side edges (the adjacent first side edge 21 and the second side edge 22) together. The first base fabric layer 10 and the second fabric layer 20 are laminated together to form the base fabric layer 4 such that the direction of winding of the band-shaped body 15 and the direction of winding of the band-shaped body 25 are different each other. For the plurality of ground warp yarns 13 and 23 and the plurality of ground weft yarns 14 and 24, only parts of them are shown in the figures.

It is self-evident that the direction of the felt length dimension of the first base fabric layer 10 parallel to the ground warp yarn 13 of the band-shaped body 15 and the machine direction (MD) is provided with a certain angle determined by the width $Ws_1$ of the band-shaped body and the felt length dimension L, and similarly the direction of the felt length dimension of the band-shaped body 25 parallel to the ground warp yarn 23 of the second base fabric layer 20 and the machine direction (MD) is provided with a certain angle determined by the width $Ws_2$ of the band-shaped body and the felt length dimension L, as a matter of course. Although in FIG. 1 part of the batt layer 5 is omitted for ease of understanding, actually the batt layer 5 is placed uniformly at least over the entire wet paper web-side surface 2 of the base fabric layer 4. Further, in the present specification, the felt length dimension L refers to a perimeter of the papermaking felt 1.

Although the base fabric layer 4 of the felt illustrated in FIG. 1 is a base fabric layer in which the first base fabric layer 10 formed by spirally winding the band-shaped body 15 right-handed and the second base fabric layer 20 formed by spirally winding the band-shaped body 25 left-handed are laminated together, the band-shaped bodies of both base fabric layers may be wound in left-right reversal. The right-handed winding herein refers to, when with reference to FIG. 2 rolls 7 and a stock roll 8 are viewed from the side of the start of winding of the band-shaped body, the direction of right-handed rotation of the rolls 7 and the stock roll 8.

Although in FIG. 1 a base fabric layer 4 in which the first base fabric layer 10 is placed on the wet paper web side of the papermaking felt and the second base fabric layer 20 is placed on the machine side of the papermaking felt is illustrated, a base fabric layer formed by placing the first base fabric layer 10 on the machine side and the second base fabric layer 20 on the wet paper web side is also possible. It is also self-evident that the band-shaped body 15 and the band-shaped body 25 are both spirally wound around the cross-machine direction (CMD) as a winding axis.

The base fabric layer mentioned above may be further laminated with one or two base fabric layers each of which is similar to each base fabric layer mentioned above and is formed by spirally winding a band-shaped body, and thus the base fabric layer of the papermaking felt may have a three-layer structure or a four-layer structure; or a laminate may be used of the base fabric layer mentioned above and a known base fabric such as a woven fabric that is woven into an endless shape on a weaving machine, a woven fabric in which ends of an ended plain-woven fabric are sewn together into an endless shape, or a woven fabric in which seam loops are formed at the two ends in the cross-machine direction of an ended woven fabric, the seam loops at both ends are engaged with each other on a papermaking machine, and a core line is inserted into their common holes to form an endless shape.

Figure 2:
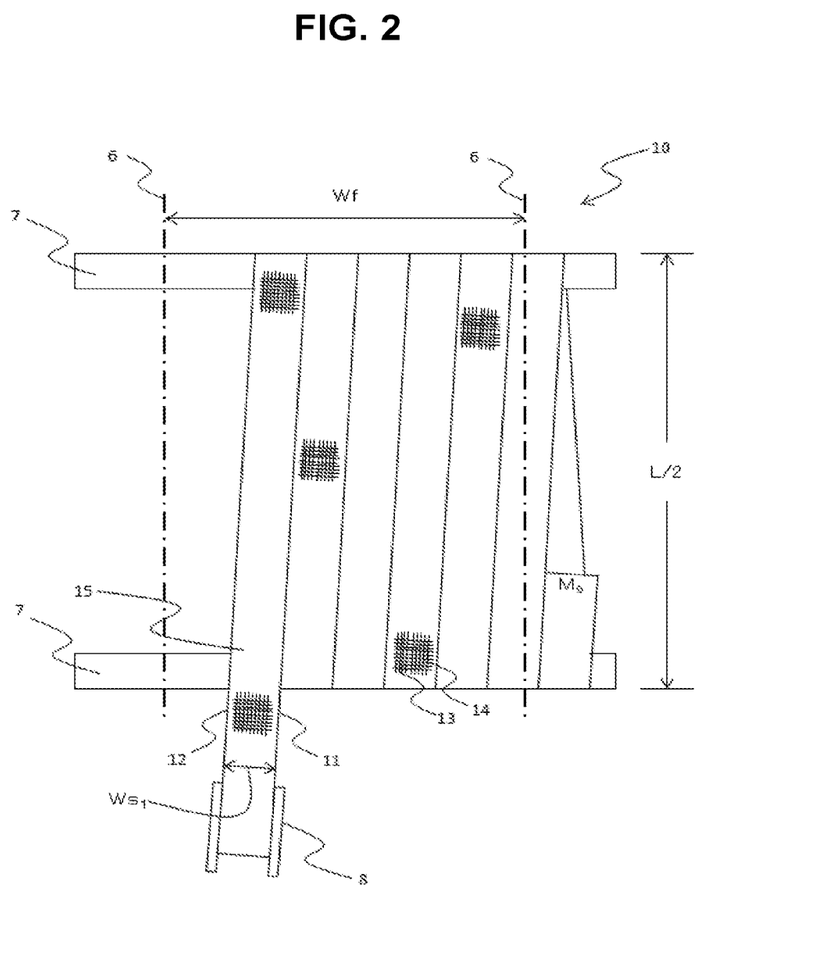
FIG. 2 is a top view showing an example of the base fabric layer of the papermaking felt of an embodiment of the present invention and a method for producing the same.

FIG. 2 is a top view showing an example of the base fabric layer formed by spirally winding a band-shaped body, for example the first base fabric layer 10, of the papermaking felt according to an embodiment of the present invention and a method for producing the same. As shown in FIG. 2, the first base fabric layer 10 is formed by, while rotating rolls 7 and a stock roll 8 of the band-shaped body, performing spiral winding around the two parallel arranged rolls (the rolls that determine the felt length dimension L), with an end $M_0$ of the band-shaped body 15 as a starting point, in such a manner that the first side edge 11 and the second side edge 12 of the band-shaped body 15 are adjacent and joining the side edges together until the width Wf of the felt is ensured. At this time, the stock roll 8 moves left in accordance with the conditions of fabrication of the first base fabric layer 10.

The method for joining the side edges of adjacent parts of the band-shaped body 15 together is not particularly limited, the side edges of adjacent parts of the band-shaped body 15 can be joined together using sewing together with a sewing machine, melting, fusion adhesion, etc. The side edges are preferably made adjacent and joined together to such a degree that there is no gap. The side edges may overlap approximately several millimeters; in the present specification, also the case where the side edges overlap approximately several millimeters is included in the concept of being made adjacent.

Also the second base fabric layer 20 can be produced in a similar manner to the first base fabric layer 10. That is, similarly to the first base fabric layer 10 illustrated in FIG. 2, the second base fabric layer 20 is formed by, while rotating the rolls 7 and the stock roll 8 of the band-shaped body, performing spiral winding around the two parallel arranged rolls (the rolls that determine the felt length dimension L), with an end $M_0$ of the band-shaped body 25 as a starting point, in such a manner that the first side edge 21 and the second side edge 22 of the band-shaped body 25 are adjacent and joining the side edges together until the width Wf of the felt is ensured (not shown). At this time, the stock roll 8 moves left in accordance with the conditions of fabrication of the second base fabric layer 20. The lamination is performed while the directions of winding of the band-shaped bodies 15 and 25 of the first base fabric layer 10 and the second base fabric layer 20 of the base fabric layer 4 of the papermaking felt 1 of an embodiment of the present invention are set opposite to each other; hence, the first base fabric layer 10 and the second base fabric layer 20 are laminated together while either of the first base fabric layer 10 and the second base fabric layer 20 is inverted.

The second base fabric layer 20 may be formed also by, while rotating the rolls 7 and the stock roll 8 of the band-shaped body, performing winding while placing the end $M_0$ of the band-shaped body 25 of the second base fabric layer 20 on the left side of the two parallel arranged rolls (the rolls that determine the felt length dimension L) (placing left-right symmetric to FIG. 2) in such a manner that the first side edge 21 and the second side edge 22 of the band-shaped body 25 are adjacent and joining the side edges together until the width Wf of the felt is ensured (not shown). At this time, the stock roll 8 moves right in accordance with the conditions of fabrication of the second base fabric layer 20.

Since the second base fabric layer 20 thus obtained is different in the direction of winding from the first base fabric layer 10, the base fabric layer 4 can be obtained by laminating together the first base fabric layer 10 and the second base fabric layer 20 while neither of them is inverted.

Figure 3:
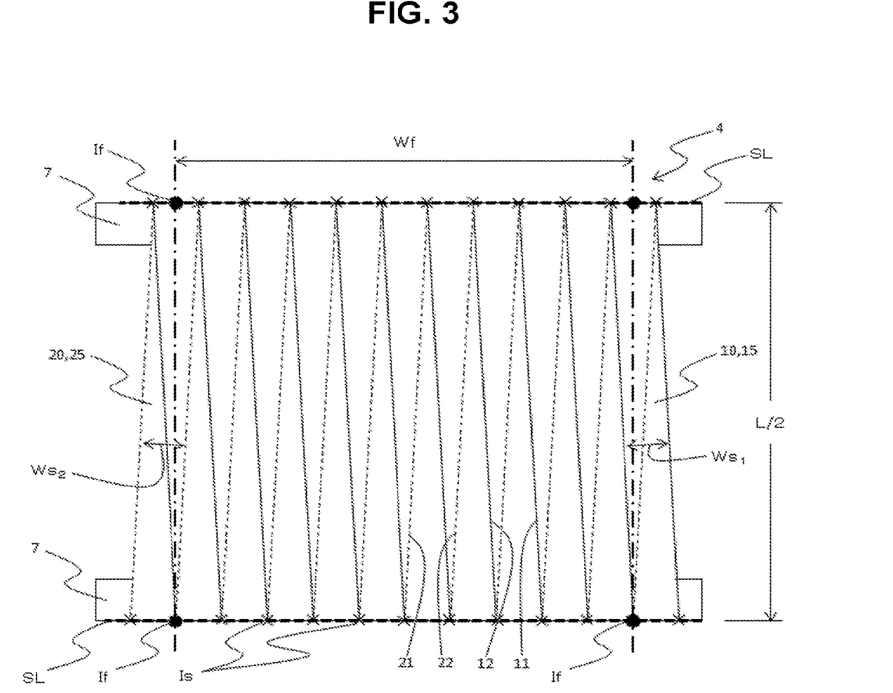
FIG. 3 is a top view showing an example of the base fabric layer during a manufacture of the papermaking felt of an embodiment of the present invention (before line slanting)

FIG. 3 is a top view showing a base fabric layer 4 in which the first base fabric layer 10 and the second base fabric layer 20 are laminated together such that the first base fabric layer 10 is on the wet paper web side and the second base fabric layer 20 is on the machine side. Here, when the base fabric layer 4 is fabricated while the width $Ws_1$ of the band-shaped body 15 of the first base fabric layer 10 and the width $Ws_2$ of the band-shaped body 25 of the second base fabric layer 20 are set to the same width, as shown in FIG. 3, the magnitude of the displacement with respect to the cross-machine direction between the two intersection points If formed by the straight line SL that passes through the intersection points Is of the side edge s of the first base fabric layer 10 and the second base fabric layer 20 and has the minimum angle to the cross-machine direction and both ends of the papermaking felt is zero. That is, the intersection points Is of the side edges of the layers (the straight line SL) are parallel to the cross-machine direction.

Figure 4:
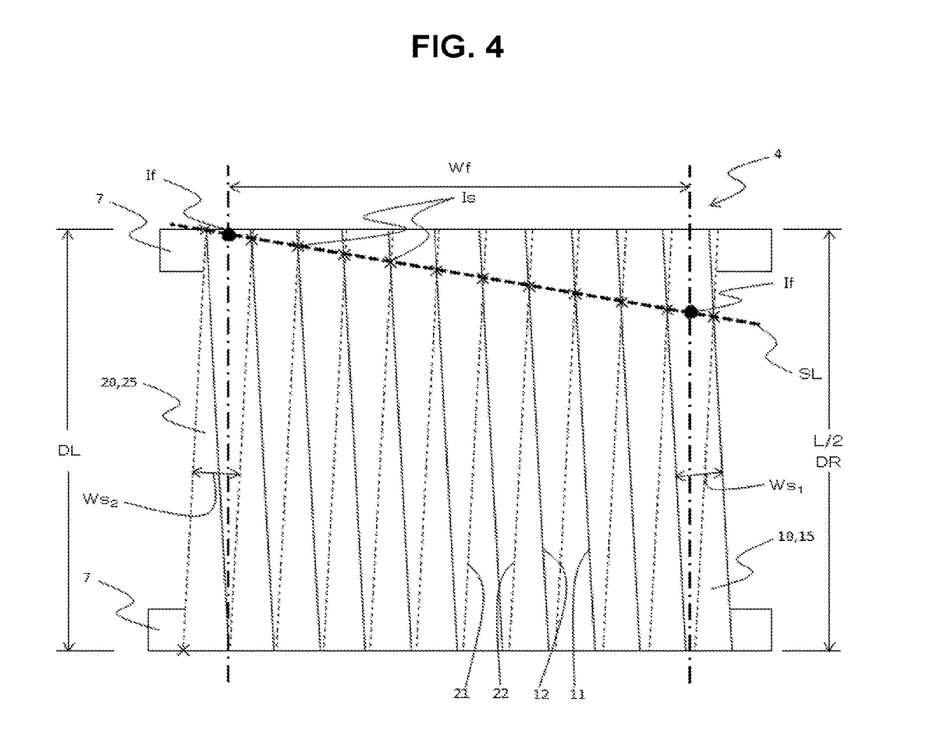
FIG. 4 is a top view showing the example of the base fabric layer of the papermaking felt of an embodiment of the present invention.

When this base fabric layer 4 is used to fabricate a papermaking felt and the papermaking felt is used in a papermaking machine, the intersection points Is of the side edges of the layers may cause a problem with the smoothness of wet paper web (paper marks) or the running performance (in particular, vibration). Thus, the base fabric layer obtained in FIG. 3 is subjected to line slanting so that, as shown in FIG. 4, the intersection points Is of the side edges of the layers (the straight line SL) become non-parallel to the cross-machine direction.

In the line slanting, specifically, the base fabric layer 4 is installed onto two rolls, the distances DL and DR between the two rolls are set such that one roll distance DR is smaller than the other roll distance DL, and the rolls 7 are rotated for example left-handed as viewed from the DR side. Since DR is shorter than DL, the intersection point If on the DR side progresses faster than the intersection point If on the DL side (downward in the drawing). The progress of the intersection points Is of the side edges of the layers is greater when they are positioned at the DR side. After the two intersection points If on the straight line SL connecting the intersection points Is of the side edges of the layers are displaced from each other with respect to the cross-machine direction to some extent (preferably 2 cm or more), the distances DL and DR are set equal, and the base fabric layer 4 is subjected to, for example, heat processing; thereby, a base fabric layer 4 in which the intersection points Is of the side edges of the layers (the straight line SL) are not parallel to the cross-machine direction can be obtained. It is possible to reverse the vertical arrangement of the layers or reverse the directions of winding of the band-shaped bodies of the layers.

Figure 5:
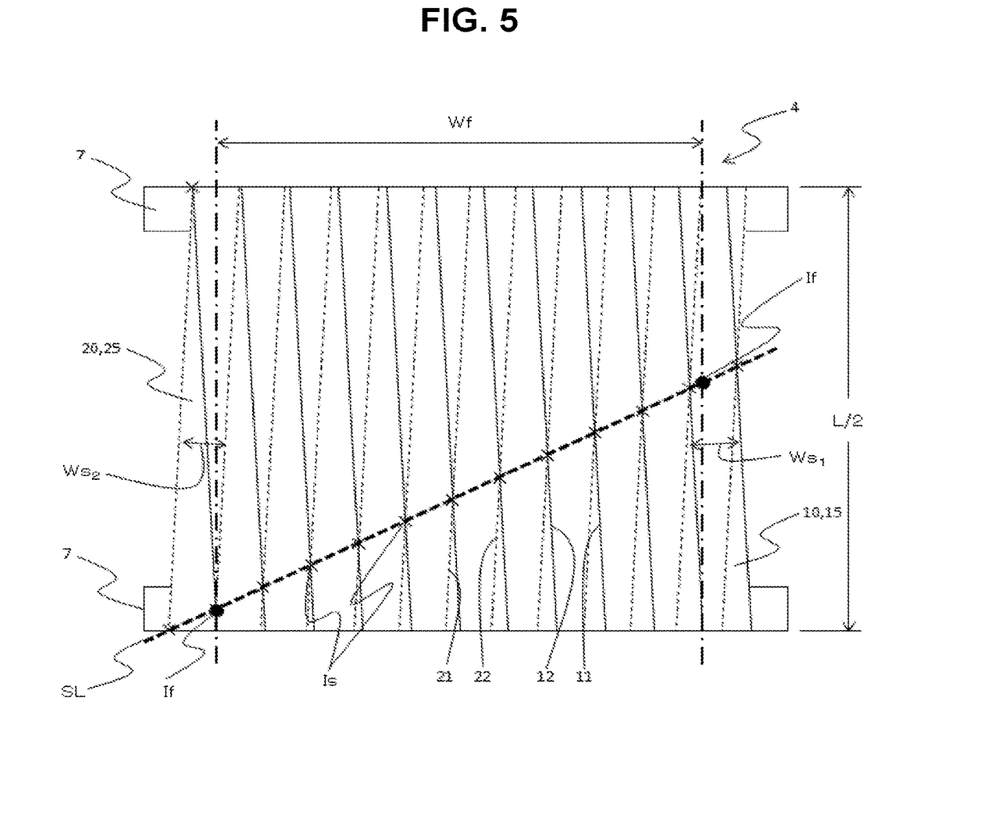
FIG. 5 is a top view showing another example of the base fabric layer of the papermaking felt of an embodiment of the present invention.

FIG. 5 is a top view showing a base fabric layer 4 in which the first base fabric layer 10 and the second base fabric layer 20 are laminated together such that the first base fabric layer 10 is on the wet paper web side and the second base fabric layer 20 is on the machine side. Here, the width $Ws_1$ of the band-shaped body 15 of the first base fabric layer 10 and the width $Ws_2$ of the band-shaped body 25 of the second base fabric layer 20 are set such that $Ws_2$ is smaller than $Ws_1$. Thereby, a base fabric layer 4 in which the intersection points Is of the side edges of the layers (the straight line SL) are not parallel to the cross-machine direction can be obtained. $Ws_1$ and $Ws_2$ are preferably set such that the two intersection points If on the straight line SL connecting the intersection points Is of the side edges of the layers are displaced from each other with respect to the cross-machine direction by 2 cm or more. This is in order to avoid the length (the length in MD) of the surface under pressure when the papermaking felt passes between rolls under pressure, which length is approximately 2 cm, depending on the diameter of the roll to be put under pressure and the applied pressure. It is possible to reverse the vertical arrangement of the layers, reverse the directions of winding of the band-shaped bodies of the layers, or set $Ws_2$ larger than $Ws_1$. Although the above-mentioned displacement is 2 cm or more, the displacement is preferably 5 cm or more and is more preferably 10 cm or more. An upper limit of the displacement can be less than a half, preferably less than one third of the papermaking felt length L, but it is not particularly limited.

When the angle of inclination of the band-shaped body 15 of the first base fabric layer 10 with respect to the machine direction is denoted by θ, the number of times of winding of the band-shaped body 15 to ensure the felt width Wf is denoted by N, and the magnitude of the displacement with respect to the cross-machine direction between the two intersection points If on the straight line SL connecting the intersection points Is of the side edges of the layers is denoted by X, the following approximate expression holds.

$$\tan \theta = |Ws_1 - Ws_2| \times N \times Wf/(2 \times Ws_1 \times N \times X) = Ws_1 L$$

Therefore, $X = |Ws_1 - Ws_2| \times Wf \times L/(2 \times Ws_1^2)$

As an example, assuming that the felt length dimension L is 20 m and the width dimension Wf is 10 m, when the width $Ws_1$ of the band-shaped body 15 of the first base fabric layer 10 is set to 100 cm and the width $Ws_2$ of the band-shaped body 25 of the second base fabric layer 20 is set to 99.98 cm, the magnitude X of the displacement with respect to the cross-machine direction between the two intersection points If on the straight line SL connecting the intersection points Is of the side edges of the layers is approximately 2 cm. Similarly, when $Ws_1$ and $Ws_2$ are set to 100 cm and 99 cm, respectively, the magnitude X of the displacement with respect to the cross-machine direction between the two intersection points If on the straight line SL connecting the intersection points Is of the side edges of the layers is approximately 100 cm; and when $Ws_1$ and $Ws_2$ are set to 100 cm and 95 cm, respectively, the magnitude X of the displacement with respect to the cross-machine direction between the two intersection points If on the straight line SL connecting the intersection points Is of the side edges of the layers is approximately 500 cm.

As illustrated in FIG. 5, in the case where the width $Ws_1$ of the band-shaped body 15 of the first base fabric layer 10 and the width $Ws_2$ of the band-shaped body 25 of the second base fabric layer 20 are different, when the base fabric layers in which the band-shaped bodies are joined by winding are laminated together, the intersection points Is of the side edges of the layers are not parallel to the cross-machine direction; thus, the base fabric layer 4 can be obtained more efficiently.

Figure 6:
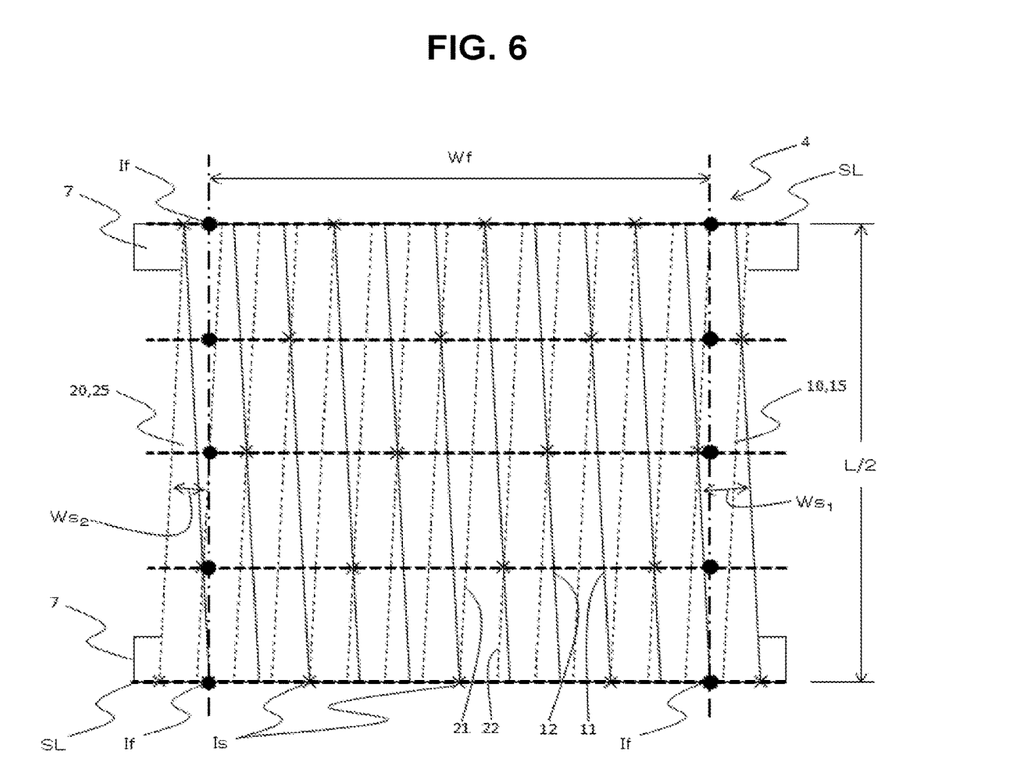
FIG. 6 is a top view showing another example of the base fabric layer during a manufacture of the papermaking felt of an embodiment of the present invention (before line slanting).

In a base fabric layer 4 in which the first base fabric layer 10 and the second base fabric layer 20 are laminated together such that the first base fabric layer 10 is on the wet paper web side and the second base fabric layer 20 is on the machine side, when, as an example, the felt length dimension L is set to 20 m, the width dimension Wf to 10 m, the width $Ws_1$ of the band-shaped body 15 of the first base fabric layer 10 to approximately 100 cm, and the width $Ws_2$ of the band-shaped body 25 of the second base fabric layer 20 to approximately 75 cm, a structure of FIG. 6 is obtained. In this case, the magnitude of the displacement with respect to the cross-machine direction between the two intersection points If formed by the straight line SL that passes through the intersection points Is of the side edges of the first base fabric layer 10 and the second base fabric layer 20 and has the minimum angle to the cross-machine direction and both ends of the papermaking felt is zero. That is, the intersection points Is of the side edges of the layers (the straight line SL) are parallel to the cross-machine direction.

In the example of FIG. 6, although the number of intersection points Is of the side edges of the layers on the straight line SL parallel to the cross-machine direction is reduced from that of the example of FIG. 3, the number of straight lines SL is increased; hence, there may still be adverse effects on the running performance of the papermaking felt (in particular, vibration). Thus, the base fabric layer 4 obtained is subjected to the line slanting mentioned above, or the width $Ws_1$ of the band-shaped body 15 of the first base fabric layer 10 and the width $Ws_2$ of the band-shaped body 25 of the second base fabric layer 20 are set such that the straight line SL is not parallel to the cross-machine direction. That is, the width $Ws_1$ of the band-shaped body 15 of the first base fabric layer 10 and the width $Ws_2$ of the band-shaped body 25 of the second base fabric layer 20 are preferably set such that the least common multiple of the width $Ws_1$ and the width $Ws_2$ is larger than the felt width Wf. By setting the width $Ws_1$ of the band-shaped body 15 of the first base fabric layer 10 and the width $Ws_2$ of the band-shaped body 25 of the second base fabric layer 20 as above, the straight line SL more safely become non-parallel to the cross-machine direction, and the smoothness of the wet paper web and the running stability are improved. In other words, the smoothness of wet paper web are improved for example by reducing the mark to the wet paper web, and further the occurrence of vibration or an unusual sound can be prevented during the running.

A desired papermaking felt can be obtained by integrating the batt layer 5 with the base fabric layer 4 obtained in the above and performing cutting with the felt width dimension Wf parallel to the felt running direction. Although the cutting with the felt width dimension Wf may be performed on each of the first base fabric layer 10 and the second base fabric layer 20, usually in this case, in view of the dimension change in a post-process, a width larger than the felt width dimension Wf is ensured for the width dimension of each base fabric layer and cutting is performed with the desired felt width dimension Wf in the final process.

As the material of the ground warp yarns 13 and 23 and the ground weft yarns 14 and 24 of the band-shaped bodies 10 and 20 and the batt layer 5, polyesters (polyethylene terephthalate, polybutylene terephthalate, and the like), aliphatic polyamides (polyamide 6, polyamide 66, polyamide 11, polyamide 12, polyamide 612, and the like), an aromatic polyamide (an aramid), polyvinylidene fluoride, polypropylene, a polyetheretherketone, polytetrafluoroethylene, polyethylene, wool, cotton, a metal, etc. may be used. As the ground warp yarns 13 and 23 and the ground weft yarns 14 and 24, a monofilament single yarn, a monofilament twisted yarn, a multifilament single yarn, or a multifilament twisted yarn of the material mentioned above may be used. The form such as the fineness and the length of the ground warp yarns 13 and 23, the ground weft yarns 14 and 24, and the batt layer 5 is not particularly limited, and may be selected as appropriate in accordance with the design.

The form of the band-shaped bodies 10 and 20 may be a woven fabric using the material mentioned above, but is not limited to woven fabrics, and a lattice-like material in which ground warp yarns and ground weft yarns are arranged vertically may be used.

The mass per unit area of the felt 1 is not particularly limited, but the felt 1 is usually produced with 500 g/m² to 2000 g/m², and the mass per unit area is selected as appropriate in accordance with the grade of the paper to be produced by papermaking and the part where the felt is used in the papermaking machine. The thickness of the felt 1 is not particularly limited, but the felt 1 is usually produced with 1.5 mm to 5.0 mm in accordance with mainly the mass per unit area.

Example

Hereinafter, the present invention will be described more specifically by means of Examples. However, the following Examples are mere examples of the present invention and the present invention should not be limited to those Examples.

First, following band-shaped body was provided, and a first base fabric layer and a first base fabric layer were respectively manufactured.
<Band-Shaped Body of the First Base Fabric Layer>
Warp yarn: a monofilament single yarn made of polyamide 6 with 1200 dtex
Weft yarn: a monofilament single yarn made of polyamide 6 with 1200 dtex
Structure: 40 warp yarns/5 cm, 40 weft yarns/5 cm, a 1/1 plain structure, the width of the band-shaped body: 100 cm
<First Base Fabric Layer>
While the band-shaped body mentioned above was spirally wound right-handed such that the felt length dimension was 15.0 m, the first side edge and the second side edge were sewn together with a sewing machine. The width dimension of the outer peripheral base fabric layer was set to 650 cm (the felt width dimension was set to 520 cm).
<Band-Shaped Body of the Second Base Fabric Layer>
Warp yarn: a monofilament single yarn made of polyamide 6 with 1200 dtex
Weft yarn: a monofilament single yarn made of polyamide 6 with 1200 dtex
Structure: 40 warp yarns/5 cm, 40 weft yarns/5 cm, a 1/1 plain structure, the width of the band-shaped body: 99.5 cm
<Second Base Fabric Layer>
While the band-shaped body mentioned above was spirally wound left-handed such that the felt length dimension was 15.0 m, the first side edge and the second side edge were sewn together with a sewing machine. The width dimension of the inner peripheral base fabric layer was set to 650 cm (the felt width dimension was set to 520 cm).
<Base Fabric Layer>
The first base fabric layer and the second base fabric layer mentioned above were then laminated together to prepare a base fabric layer.
<Papermaking Felt>
For the papermaking felt, a 500 g/m² short fiber batt of polyamide 6 with a fineness of 11 dtex was entangled and integrated by needling with the wet paper web-side surface of the base fabric layer mentioned above, and a 200 g/m² short fiber batt of polyamide 6 with a fineness of 13 dtex was entangled and integrated by needling with the machine-side surface of the base fabric layer; the processes of drying and curing were performed; and finally cutting was performed with the felt width dimension of 520 cm. The magnitude of the displacement with respect to the cross-machine direction between the two intersection points formed by the straight line that passes through the intersection points of the side edges of the band-shaped bodies of the first base fabric layer and the second base fabric layer and has the minimum angle to the cross-machine direction and both ends of the papermaking felt at this time was approximately 20 cm.

When the papermaking felt mentioned above is used in a papermaking machine, the smoothness and particularly the running stability (in particular, the prevention of the occurrence of vibration and an unusual sound) are expected to be improved. This is because the intersection points of the joint portions of the side edges of the layers of the base fabric layer are not arranged in a straight line in the cross-machine direction.

as well as a base fabric layer of the papermaking felt The base fabric layer mentioned above may be used for a base fabric layer of any papermaking equipment, such as a papermaking wire, a belt for wet paper web conveyance, and a belt for shoe pressing having a similar structure of the base fabric layer as well as a base fabric layer of the papermaking felt.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A papermaking felt comprising:
a base fabric layer and at least one batt layer integrated with the base fabric layer,
wherein the base fabric layer comprises at least two layers of a first base fabric layer and a second base fabric layer, in which each of the first base fabric layer and the second base fabric layer is formed by spirally winding a band-shaped body having a width smaller than a width of the papermaking felt and having a plurality of ground warp yarns, a plurality of ground weft yarns, a first side edge, and a second side edge in such a manner that the first side edge and the second side edge are adjacent and joining the side edges together, and the first base fabric layer and the second base fabric layer are laminated together such that their directions of spiral winding are different each other, and
wherein a straight line passing through a first intersection point and a second intersection point of the side edges of a respective band-shaped bodies of the first base fabric layer and the second base fabric layer has a minimum angle to a cross-machine direction, and a magnitude of a displacement in a machine direction to the cross-machine direction between two intersection points formed by the straight line and both ends of the papermaking felt is 2 cm or more.

2. The papermaking felt according to claim 1, wherein the magnitude of the displacement is 5 cm or more.

3. The papermaking felt according to claim 1, wherein the magnitude of the displacement is 10 cm or more.

4. The papermaking felt according to claim 1, wherein the width of the band-shaped body of the first base fabric layer and the width of the band-shaped body of the second base fabric layer are different.

5. The papermaking felt according to claim 4, wherein a least common multiple of the width of the band-shaped body of the first base fabric layer and the width of the band-shaped body of the second base fabric layer is larger than the width dimension of the papermaking felt.

6. The papermaking felt according to claim 5, wherein the intersection points of a joint portions of the side edges of the layers are not arranged in the straight line in the cross-machine direction.

* * * * *